Patented Apr. 8, 1930

1,754,208

UNITED STATES PATENT OFFICE

LINN BRADLEY, OF MONTCLAIR, NEW JERSEY, AND EDWARD P. McKEEFE, OF PLATTSBURGH, NEW YORK, ASSIGNORS TO BRADLEY-McKEEFE CORPORATION, OF NEW YORK, N. Y., A CORPORATION OF NEW YORK

PRODUCTION OF COOKING LIQUOR WHICH CONTAINS SODIUM HYDROXIDE

No Drawing.   Application filed October 20, 1926.   Serial No. 143,014.

This invention relates to improvements in the production of cooking liquors containing caustic soda from liquors containing sodium carbonate. More particularly, the invention comprises an improved process of causticizing sodium carbonate solutions with lime for the production of cooking liquors for use in the cooking of wood for the manufacture of chemical pulp.

In the ordinary causticizing process for converting sodium carbonate solutions into solutions of caustic soda or sodium hydroxide, more or less sodium carbonate remains uncausticized at the end of the operation and it is necessary to separate the lime mud or sludge (calcium carbonate) from a highly caustic liquor. As the causticizing proceeds, the amount of remaining sodium carbonate decreases and the amount of unutilized lime or calcium hydroxide also decreases so that, near the end of the causticizing, the solution becomes highly caustic and reaches equilibrium while there still remains more more or less unchanged sodium carbonate and more or less unutilized lime. It is well known that the ratio of sodium hydroxide to sodium carbonate which can be obtained by causticizing a sodium carbonate solution with lime depends to a considerable extent upon the concentration of such chemicals in the liquor. In general, the higher the concentration, the lower the percentage of sodium carbonate which can be thus converted into sodium hydroxide. This is the case in the production of cooking liquors for the so-called soda process, and to a considerable extent in the so-called sulfate process.

In the improved process of the present invention, both the sodium carbonate content of the liquor treated and the lime used for the causticizing are utilized more completely and effectively than in the ordinary process; and the present process has other advantages, hereinafter more fully set forth.

According to the present invention, we carry out the causticizing of the sodium carbonate solution in two stages, employing, in the preliminary or first stage, an amount of lime insufficient for complete causticizing and we separate the resulting lime mud or sludge from the solution while it still contains considerable sodium carbonate. This partially causticized solution is then treated with a further amount of lime used in excess so that a high degree of causticity is produced. The resulting lime mud or sludge, which still contains unutilized lime, is then employed in treating a fresh amount of sodium carbonate solution in the first step of the process, so that the excess of lime is utilized and so that the highly caustic liquor which accompanies the incompletely utilized lime sludge combines with the fresh solution which is being partially causticized.

The present invention also provides an improved process in which the causticizing is carried out in two successive steps or stages, with partial or incomplete causticizing during the first step, separation of the lime mud, washing of the lime mud, and utilization of the wash water in regulated amounts for addition to and dilution of the partially causticized solution, which is then subjected to the second causticizing step to complete the causticizing in a more dilute solution than that of the first step. By operating in this way, the preliminary causticizing step can be carried out in a highly concentrated solution in which partial causticizing can readily be effected, and the completion of the causticizing is carried out in a more dilute solution which can be so regulated as to give a cooking liquor of suitable strength for use in the manufacture of pulp.

The solutions which are treated according to the present invention, may be solutions containing only sodium carbonate, or they may contain other sodium compounds in small or varying amounts, particularly sodium sulfid. Other sodium compounds may also be present in relatively small amounts, such as sodium sulfate, sodium sulfite, sodium thiosulfate, etc. Solutions regenerated from the residual liquors of pulp making operations in which sodium compounds, and particularly caustic soda are employed, may thus be utilized, for example, the solution to be causticized may be a solution of sodium carbonate, or sodium carbonate and sodium sulfid, or sodium carbonate containing other sodium salts in varying amounts, obtained by leaching or dissolving the furnace product or melt produced by concentrating and calcining or smelting the residual liquors from pulp making processes in which caustic soda is employed (e. g. the soda process so-called), or from processes in which caustic soda and sodium sulfid are employed (e. g. the sulfate process, etc.) or other processes in which caustic soda and other sodium salts are employed.

Such solutions may contain considerable "carbon" or carbonaceous material from the regenerating or calcining step of the regeneration process and in such case the problem is presented of clarifying the solution to remove this carbon therefrom. The improved process of the present invention is well adapted for effecting such clarification.

In carrying out the present process, the first causticizing step is carried out with an amount of lime or calcium hydroxide insufficient to complete the causticizing, leaving an excess of sodium carbonate in the partially causticized solution. This partial causticizing will result in the complete or nearly complete utilization of the calcium hydroxide which can then be separated from the partially causticized solution and washed one or more times to separate the adhering solution therefrom. This wash water may be added in regulated amounts to the partially causticized solution.

In the second, or final causticizing step, the amount of calcium hydroxide or lime employed is sufficient to complete the causticizing of the sodium carbonate to the desired degree. By using an excess of lime or calcium hydroxide, over and above that required for completing the causticizing, and particularly by operating in solutions which are somewhat diluted with wash water in case the original solution is a highly concentrated sodium carbonate solution, a high causticity can be obtained with relatively little, if any, sodium carbonate remaining uncausticized in the solution. The lime mud from this final causticizing step may then advantageously be employed in the preliminary causticizing step, thus utilizing the excess of calcium hydroxide which the lime mud contains, and utilizing the fresh solution for removing adhering highly causticized liquor from the spent lime mud.

The solution so causticized may, for example, be a solution containing only or mainly sodium carbonate, or it may, for example, be a solution containing both sodium carbonate and sodium sulfid with an amount of sodium sulfid considerably smaller than that of the sodium carbonate.

The relative amounts of lime or calcium hydroxide employed in the preliminary and final steps of the process can be regulated; and, by regulating the strength of the solutions initially treated and the dilution of this solution by wash water from the lime mud of the first causticizing step, it is possible to produce at the end of the process a cooking liquor of suitable composition and concentration for utilization directly as a cooking liquor. Further adjustment of the concentration or composition of this solution can however be made when required.

The second or final causticizing treatment can advantageously be carried out with a sufficient amount of calcium hydroxide or lime for the complete causticizing treatment and the excess can then be utilized in the first causticizing step upon a further amount of sodium carbonate liquor. By operating in this way, a high causticity of the solution is obtained at the end of the second causticizing step and a high degree of utilization of the lime is effected at the end of the first causticizing step.

Instead however, of adding such a sufficient amount of lime for the complete causticizing step at the beginning of the second step, a somewhat smaller amount may be added in the second or final stage of the causticizing treament, for example, such an amount as will properly complete the causticizing of the liquor and leave an amount of unutilized lime in the lime mud less than required for the corresponding preliminary causticizing step of the process. In this case also, the lime mud from the second step may advantageously be returned for use in the first step, together with such added amounts of fresh lime or calcium hydroxide as may be required in that step for carrying out the partial causticizing.

In some cases, the mount of lime or calcium hydroxide added at the beginning of the second or final causticizing step may be such that little, if any, excess calcium hydroxide is present at the end of the process although it is advantageous to have a sufficient amount present to carry the causticizing to a high degree. The lime mud in this case will also contain considerable of the highly causticized solution and it may advantageously be returned for use in the first causticizing step, not only to complete the utilization of such excess calcium hydroxide as it may contain, but also to avoid the necessity of washing the lime mud to remove the adhering highly caustic solution, and also to assist in the clarification of the solution in the preliminary step of the process. By utilizing the lime mud from the second step, without washing it from adhering solution, by adding it in the first step, the final washing is from a solution which is less highly caustic, and a single washing at the end of one stage of the process is all that is required.

Where the solution initially treated is of high concentration such that its causticizing by present methods would be incomplete and considerable amounts of sodium carbonate would remain uncausticized, the solution is advantageously diluted with a regulated amount of wash water from the washing of the lime mud at the end of the first step of the process. In such case, the final stage of causticizing is carried out at a lower concentration than in the preliminary stage, so that a higher degree of conversion of sodium carbonate into sodium hydroxide can be effected, particularly by the use of a considerable excess of lime in the second causticizing stage. Moreover, the causticized solution at the end of the second causticizing step is not diluted with any wash water because the washing of the lime mud is omitted at that step and the lime mud and adhering highly causticized liquor returned for use in the first step of the process.

When the raw liquor treated in the first step has a high concentration of sodium carbonate, it may in some cases be advantageously treated with a sufficient amount of lime or calcium hydroxide to carry the causticizing operation as far as it can readily be carried in a solution of such high concentration, but without leaving any considerable amount of calcium oxide or hydroxide in the resulting lime mud. Such a lime mud can be readily washed to remove its soluble sodium compounds, thus leaving the lime mud in a suitable form for further treatment, for example, for reburning in a rotary lime kiln to regenerate the lime required for the operation.

The strong liquor removed from the lime mud of the preliminary treatment, and which may still contain a considerable amount of sodium carbonate, can then be diluted with a regulated amount of wash water from the washing of the lime mud, to give a more dilute solution of regulated content of sodium compounds. In such more dilute solutions, the causticizing can be more readily carried to a high degree of causticity, particularly where an excess of lime or calcium hydroxide is employed.

Where, for example, the amount of calcium hydroxide employed in the first step of the process amounts to about fifty per cent of that required for the complete causticizing, the partially causticized solution will contain approximately one-half its sodium carbonate content converted into sodium hydroxide. If an increased amount, up to e. g. 85%, of the lime employed in the second step is utilized in that step, the amount remaining for use in the first step will be correspondingly reduced. On the other hand, if the amount of lime employed in the first step is increased, e. g. up to around 85% or more of that required for the complete causticizing, a corresponding degree of causticizing will be obtained and less lime will be required in the second step for completing or nearly completing the causticizing treatment. At the end of the first step, the degree of causticizing may vary, for example, from 50 to 75% or more, although the degree of causticizing can be regulated.

Inasmuch as the amount of highly causticized liquor adhering to and separated with the lime mud at the end of the second step will vary with the amount of the lime mud, it is more advantageous, with highly concentrated solutions, to effect the greater part of the causticizing during the first step, so that only a relatively less amount of lime will be required for the second or final causticizing step. This second step can then be carried out without any large excess of lime, but nevertheless with a sufficient amount of lime to bring the solution to high causticity, and leave only a small amount of lime mud to be separated from the highly caustic solution. When only a small excess of lime is employed, it can be utilized, together with sufficient additional lime in the preliminary causticizing step.

The causticizing operations of the present invention may be carried out in apparatus of varying character, for example, utilizing apparatus such as is now commonly used in causticizing operations. For example, the strong raw solution containing the sodium carbonate to be causticized may be run into a suitable mixing tank or causticizing tank which contains the lime mud from the final causticizing step and from which the clarified cooking liquor has been decanted. The lime mud can then be thoroughly agitated with the liquor and such further amount of lime as may be required can be added thereto for the preliminary causticizing. The causticizing can be promoted by heating the liquor, e. g. to the boiling point, and by vigorous and thorough agitation to promote the reaction between the calcium hydroxide and the sodium carbonate.

The separation of the lime mud from the liquor at the end of the preliminary causticizing step may be effected, for example, by means of a continuous type of filter, and the lime mud may then be washed with a regulated amount of water and the wash water employed as above described, particularly by adding some of the stronger of the wash water to the partially causticized liquor. Some of the wash water may also be employed for dissolving sodium carbonate, or sodium carbonate with a smaller amount of sodium sulfid. Some of the more dilute washings may also be employed for the preliminary washings of the unwashed lime mud.

Instead of directly filtering the lime mud from the strong partially causticized liquor, the mud may be allowed to settle, the strong partially causticized liquor decanted and the settled lime mud then washed by admixture with wash water and the resulting mixture of lime mud and water filtered, e. g. through a continuously operating filter such as a filter of the vacuum type.

In carrying out the second or final causticizing step, a causticizing tank provided with a suitable agitating device can be used and the operation can be promoted by heating and agitation. The causticized liquor can then be separated from the lime mud, for example, by settling and decantation of the clear liquor, or by passing the mixture at a regulated rate into a settler of the continuous type, or by filtering the liquor from the lime mud in a filter of the continuous type. One or more filters of the continuous type may be employed in either or both of the operations of separating the lime mud from the partially or completely causticized liquor.

The lime utilized in the process may be quick lime or slaked lime (calcium hydroxide), or mixtures. The lime or calcium hydroxide can be added directly to the partially causticized solution at the beginning of the second step and the operation promoted by heating to boiling and by thorough agitation; or the lime or calcium hydroxide may be mixed with a smaller portion of the liquor and then added to the main amount of liquor. When quick lime or calcium oxide is thus added, the heat of hydration may heat the liquor to the boiling point. Instead of using part of the liquor for slaking the lime, the washings of a portion thereof may be utilized and may permit of a better slaking of the lime than with a stronger liquor containing a high content of sodium carbonate. When the hydrating of the quick lime is effected in the liquor, the heat of reaction assists in heating the liquor to be causticized.

One of the advantages which the present invention presents is in clarifying solutions containing organic matter such as carbonaceous material from the calcining operation of the regenerative process. With such liquors containing finely divided carbon, etc., the liquor is subjected to two successive clarifications and all of the carbon that is not removed by the first causticizing step and is later removed during the second causticizing step is returned to the first step so that it may be considered that the removal of the carbonaceous matter from the solution is effected at the end of the first step of the process.

The washed lime mud which may have carbon admixed therewith is in advantageous condition for being reburned in a rotary lime kiln, after it has been substantially freed from sodium compounds by a suitable washing treatment.

The causticizing process of the present invention is particularly advantageous in the treatment of solutions containing sodium carbonate as the primary constituent and a lesser but substantial amount of sodium sulfid and when the lime mud is to be reburned to form another lot of quick lime for the causticizing operation. By such causticizing process, the solution of sodium carbonate and sodium sulfid, with or without small and varying amounts of other sodium compounds, can be treated to convert a high percentage of the sodium carbonate into sodium hydroxide while conserving and reutilizing the sodium sulfid.

When the residual liquors from such a cooking process are treated for the regeneration of a cooking liquor, it is desirable to recover a high percentage of sodium carbonate and also to recover a high percentage of sodium sulfid. By concentrating the residual liquor and subjecting the resulting concentrated liquor to a regulated heat treatment sufficient to decompose the organic compounds and to reduce the oxy-sulfur compounds of sodium to sodium sulfid, a furnace product is obtained from which a solution containing mainly sodium carbonate and sodium sulfid is obtained. If, instead of carrying out the furnacing operation in the usual smelting and burning type of furnace in which the carbon is substantially all consumed, it is carried out in a rotary incinerator or other suitable furnace, and the operation regulated, a large portion of the carbon resulting from the decomposition of organic matter will remain with the sodium compounds, and the solution of sodium compounds may in such case contain finely divided carbon which will be removed during the causticizing and clarifying steps of the process. In such furnacing operation the conditions are advantageously kept such as will avoid driving off an excessive amount of sulfur or sulfur compounds such as sulfur dioxide, sulfur trioxide, COS, etc. For this purpose, the amount of air passing through the furnace may be kept low, thus reducing the formation of oxides of carbon, such as carbon monoxides, which would otherwise react with some of the sulfur content of the material, e. g. to form COS. A larger amount of sulfur is removed when the carbon contained in the furnace charge is burned to carbon monoxide or carbon dioxide or mixtures thereof, than when the decomposing and reducing steps are regulated so as to leave a large amount of unconsumed carbon in the furnace product along with the sodium compounds. Also, less sodium compounds seem to be carried along with the gases from the furnace when the volume of gas produced therein is kept low. If insufficient organic matter is present in the furnace charge, additional fuel or carbon in regulated amount may be added to assist in the decomposing and reducing steps. Also, sodium sulfate may be added to the material prior to the reducing operation, e. g. by adding it to the residual liquor prior to the concentrating and reducing steps, in this way supplying additional sodium compounds to the process. By regulating the reducing steps in the manner described, the recovered sodium compounds will contain a fair sodium sulfid content and the loss of soda up the stack can be kept low in amount.

In such case, however, the solution of sodium compounds may contain a fairly large amount of carbon in finely divided state. When the resulting solution is subjected to the first causticizing step, the lime mud containing the excess calcium hydroxide will serve to clarify the solution and the resulting lime mud from the first causticizing step will carry with it most of the carbon and will, after washing, be suitable for use for the regeneration of lime therefrom by reburning. The calcium carbonate of the lime mud will contain the carbon in a most intimate state of admixture therewith.

In case the carbon is not completely removed by the first causticizing step, a further clarifying treatment will take place during the second causticizing step and a further amount of carbon will be separated with the lime mud at the end of the second or final causticizing step. When this resulting lime mud is then added in the first causticizing step, the resulting lime mud from that step may be considered to carry all of the carbon from a corresponding amount of liquor.

The intimate mixture of calcium carbonate and carbon so produced is, after washing, ready for drying and burning to decompose the calcium carbonate. The carbon present facilitates this reburning operation, partly because of its fuel value and partly because of the physical and chemical features involved in such reburning operation. Other fuel may be admixed or added to supplement that of the carbon.

In such a regenerative process, the sodium compounds are recovered to good advantage, the sulfur is utilized to form sodium sulfid, and the carbon is removed from the liquor in a two-stage causticizing and clarifying operation, and can be employed in the reburning of the calcium carbonate to lime, while the causticizing operation itself is advantageously carried out with high utilization of the lime employed and the production of a resulting solution of high causticity.

We have referred specifically herein to sodium carbonate, as that is the compound which will ordinarily be treated to produce caustic soda. It will be readily understood, however, that in so far as other causticizable compounds may be present in the solution which is treated they may also be causticized by our process and we do not exclude them from the scope of this application.

We claim:

1. The method of causticizing and clarifying solutions containing sodium carbonate and suspended carbon which comprises partially causticizing the same with lime, separating the resulting lime mud and part of the suspended carbon from the liquor, further causticizing the solution with an excess of lime, and thereby effecting further clarification of the solution, separating clarified and causticized liquor from the resulting lime mud and admixed carbon, and employing the lime mud with excess lime and carbon from said second causticizing operation for treating a further amount of liquor in the first step of the process, whereby the carbon removed from the liquor during both steps is separated with the lime mud at the end of the first step.

2. The method of treating residual liquors from the cooking of wood with a cooking liquor containing caustic soda and sodium sulfide, which comprises subjecting the residual liquor to concentration and carbonizing under conditions to give a furnace product containing sodium carbonate, sodium sulfide and carbon, forming a solution of the sodium compounds of the furnace product containing suspended carbon, and subjecting such solution to a two-stage causticizing treatment, first, to effect causticizing and separation of lime mud and carbon from the liquor, and second, with a further amount of lime to effect further causticizing.

3. The method of treating residual liquors from the cooking of wood with a cooking liquor containing caustic soda and sodium sulfide, which comprises subjecting the residual liquor to concentration and carbonizing under conditions to give a furnace product containing sodium carbonate, sodium sulfide, and carbon, forming a solution of the sodium compounds of the furnace product containing suspended carbon, subjecting such solution to a two-stage causticizing treatment, first, to effect causticizing and separation of lime mud and carbon from the liquor, and second, with a further amount of lime to effect further causticizing, returning the lime mud from said second causticizing step for further use in the first causticizing step and reburning lime mud and admixed carbon from the first causticizing step to produce additional lime for use in further causticizing operations.

4. The method of causticizing and clarifying liquors containing sodium carbonate, sodium sulfide and suspended carbon, which comprises subjecting the same to partial causticizing with lime, separating from the liquor the resulting lime mud and admixed carbon, subjecting the partially causticized solution to further treatment with lime in excess, returning the lime mud and excess lime from said second causticizing step for treating additional liquor in the first causticizing step, separating from the liquor the resulting lime mud and admixed carbon, and reburning the same to produce additional lime for use in the further carrying out of the process.

5. The method of treating residual liquors from the cooking of wood with a cooking liquor containing caustic soda, which comprises subjecting the residual liquor to concentration and carbonizing under conditions to give a furnace product comprising sodium carbonate and carbon, forming a solution of the sodium compounds of the furnace product containing suspended carbon, and subjecting such solution to a two stage causticizing treatment, first, to effect partial causticizing and separation of lime mud and carbon from the liquor and, second, to effect further causticizing and further removal of lime mud and suspended impurities, whereby a clarified alkaline liquor is produced suitable for use in cooking of wood.

6. The method of treating residual liquors from the cooking of wood with a cooking liquor containing caustic soda, which comprises subjecting the residual liquor to concentration and carbonizing under conditions to give a furnace product containing sodium carbonate and carbon, forming a solution of the sodium compounds of the furnace product containing suspended carbon, subjecting such solution to a two stage causticizing treatment, first, to effect partial causticizing and separation of lime mud and carbon from the liquor, and, second, to effect further causticizing and further removal of lime mud and suspended solids from the liquor, separating a clarified caustic liquor for reuse in the cooking of wood and reburning the lime mud and admixed carbon from the first causticizing step to produce additional lime for use in further causticizing operations.

7. The method of treating residual liquors from the cooking of wood with a cooking liquor containing caustic alkali, which comprises subjecting the residual liquor to concentration and carbonizing under conditions to give a furnace product containing alkali carbonate and carbon, forming a solution of the alkali compounds of the furnace product containing suspended carbon, subjecting such solution to a two stage causticizing treatment, first to effect causticizing and separation of lime mud and carbon from the liquor and second, to effect further causticizing a separating a clarified caustic liquor for use in the cooking of wood, and burning lime mud and admixed carbon to produce additional lime for use in further causticizing operations.

8. The method of producing clarified liquor containing caustic soda from a material containing sodium compounds which comprises subjecting such material to a furnacing treatment adapted to form a non-gaseous furnace product including sodium carbonate and carbon and to minimize losses of sodium compounds with the furnace gases, treating the non-gaseous furnace product with an aqueous liquor to dissolve sodium compounds therefrom, subjecting the resulting solution containing suspended carbon to a two-stage causticizing treatment, first with calcium hydroxide in amount less than the chemical equivalent of the sodium carbonate contained in the solution and then with an amount of calcium hydroxide in excess of the chemical equivalent of sodium carbonate remaining in the solution, separating from the liquor a sludge containing calcium carbonate resulting from the first treatment with calcium hydroxide, before the final treatment, washing this sludge, and using resulting washings in the process.

9. The method of producing clarified liquors containing caustic soda and sodium sulfid from a material containing a sodium-sulfur compound, which comprises subjecting such matetial to a reducing furnacing treatment adapted to form a non-gaseous furnace product including sodium carbonate, sodium sulfid and carbon and to minimize losses of sodium compounds with the furnace gases, treating a resulting non-gaseous furnace product with an aqueous liquor to dissolve therefrom sodium carbonate and sodium sulfid, subjecting the resulting solution containing suspended carbon to a two-stage causticizing treatment, first with calcium hydroxide in amount less than the chemical equivalent of the sodium carbonate and then with an amount of calcium hydroxide in excess of the chemical equivalent of sodium carbonate remaining in the solution, separating from the liquor a sludge containing calcium carbonate resulting from the first treatment with calcium hydroxide, before the final treatment, washing this sludge, and using resulting washings in the process.

10. The continuous process of converting sodium carbonate to sodium hydroxide, which comprises (a) treating a sodium carbonate containing furnace product with an aqueous liquor so as to form a solution containing sodium carbonate and suspended carbon, (b) mixing such solution with an amount of lime less than the chemical equivalent of the sodium carbonate present therein, (c) subjecting the hot mixture to a causticizing treatment so as to convert all or nearly all of the calcium hydroxide therein into calcium carbonate, (d) separating undissolved material including carbon from partially causticized liquor, (e) mixing liquor thus separated with additional lime in amount at least the chemical equivalent of the sodium carbonate present in the liquor, (f) subjecting the hot mixture to a causticizing treatment so as to convert the greater part of the remaining sodium carbonate therein into sodium hydroxide, (g) separating resulting liquor from undissolved material including calcium hydroxide, and (h)

mixing such unwashed material, as it is separated from the last mentioned liquor, with additional sodium carbonate containing solution for treatment according to step "c" and further operation of the process.

11. The process of claim 10 in which lime mud from step "c" is separated from partially causticized liquor by a continuous filtration, the separated material is washed, and the washings are used in a liquor which is treated in the process.

12. The continuous process of converting sodium carbonate to sodium hydroxide, which comprises (a) treating sodium carbonate containing material with an aqueous liquor so as to form a solution containing sodium carbonate and suspended carbon, (b) subjecting such solution to a treatment with calcium hydroxide in amount less than the chemical equivalent of the sodium carbonate present therein adapted to convert substantially all of the calcium hydroxide into calcium carbonate, (c) separating undissolved material including carbon from partially causticized liquor, (d) subjecting liquor thus separated together with additional calcium hydroxide in amount at least chemically equivalent to the sodium carbonate present in the liquor to a treatment adapted to convert a part of the sodium carbonate therein into sodium hydroxide, (e) separating resulting liquor from undissolved material including calcium hydroxide, and (f) mixing this unwashed material, as it is separated from the last mentioned liquor, with additional sodium carbonate containing solution according to step "b" for the further operation of the process.

13. The process which comprises the following steps: (a) preparing a solution comprising sodium carbonate and carbon, (b) treating at least a portion of such solution by means of material comprising calcium hydroxide so as to convert a portion only of the sodium carbonate into sodium hydroxide and so as to convert most of the calcium hydroxide into calcium carbonate, (c) separating at least a portion of the said calcium carbonate and carbon from resulting partially-causticized liquor, (d) washing the separated calcium carbonate to obtain washings which contain sodium compounds, (e) treating at least a portion of the said partially-causticized liquor with additional calcium hydroxide so as to convert a portion only of the sodium carbonate into sodium hydroxide and so as to convert a portion only of the calcium hydroxide into calcium carbonate, (f) separating as a sludge substantially all of the undissolved solids from most but not all of the resulting liquor, (g) using at least a portion of the separated sludge together with some of the soda in adhering liquor in a subsequent partial-causticizing treatment of a sodium carbonate-containing liquor; (h) using most of the resulting liquor mentioned in step "f" for a digesting treatment of cellulosic fibre-bearing material.

14. The method of causticizing sodium carbonate in solution, which comprises subjecting a solution containing sodium carbonate and carbon to a causticizing treatment with calcium hydroxide, separating at least a considerable portion of resulting liquor from resulting lime mud including carbon, later treating the separated portion of the liquor with calcium hydroxide in amount sufficient and under conditions adapted to convert some of its contained sodium carbonate into sodium hydroxide and to yield a liquor comprising sodium hydroxide and a substantial but lesser amount of sodium carbonate, removing such liquor from lime mud which contains both calcium hydroxide and calcium carbonate, washing at least a portion of the first-mentioned lime mud with water and using at least a portion of the resulting washings in producing a liquor of the process which contains a sodium-bearing compound.

15. The process as defined in claim 14 in which at least a portion of the first-mentioned lime mud is washed with water and at least a portion of the resulting washings is used in producing the first-mentioned solution comprising sodium carbonate.

16. The process as defined in claim 14 in which at least a portion of the first-mentioned lime mud is washed with water and at least a portion of the resulting washings is later admixed with partially causticized liquor prior to completing a subsequent causticizing step of the process.

17. The process as defined in claim 14 in which less calcium hydroxide is used in the initial than in the final causticizing treatment.

18. The process as defined in claim 14, in which less calcium hydroxide is converted into calcium carbonate in the final causticizing step than in the preceding treatment of the sodium carbonate containing solution.

19. The process which comprises the following steps: (a) preparing an aqueous solution which includes sodium carbonate and carbon, (b) treating such solution with calcium hydroxide so as to convert a part only of the sodium carbonate into sodium hydroxide thereby forming a sludge including calcium carbonate and carbon, (c) separating at least a portion of the sludge from partially causticized liquor, (d) treating at least a portion of the said partially causticized liquor with additional calcium hydroxide so as to convert some of the sodium carbonate into sodium hydroxide and form a sludge which contains calcium hydroxide and calcium carbonate, (e) separating a portion only of the liquor from the sludge produced in step "d"; at least a portion of the last-mentioned sludge together with some of the liquor present therewith, including sodium compounds, being utilized in step "b".

20. In a process of producing a cooking liquor which contains sodium hydroxide from a solution containing sodium carbonate and suspended carbon, the step which comprises adding to the solution containing sodium carbonate. unwashed lime mud recovered from a causticizing step carried out at a later stage in the process.

21. Process as per claim 19 which includes reburning lime mud of the process and reusing the reburned lime in the process.

22. The process as defined in claim 19, in which the sludge mentioned in step "e" and an additional amount of calcium hydroxide are utilized in step "b".

23. The method of producing sodium hydroxide, which comprises subjecting a relatively concentrated solution containing sodium carbonate and suspended carbon to a partial causticizing treatment with material including calcium hydroxide, separating resulting lime mud including carbon from partially causticized solution, diluting the relatively concentrated partially causticized solution, and further causticizing the diluted solution with an amount of lime in excess of that chemically equivalent to the sodium carbonate therein, the extent of such dilution after the said partial causticizing treatment being regulated to give directly a causticized liquor of a concentration suitable for use without an intervening evaporating treatment.

24. The method of treating sodium carbonate-containing solutions, which comprises subjecting a relatively concentrated solution containing sodium carbonate and suspended carbon to a partial causticizing treatment with material including calcium hydroxide, separating resulting lime mud including carbon from the partially causticized solution, diluting the resulting solution, and further causticizing the diluted solution with an amount of lime in excess of that chemically equivalent to the sodium carbonate therein, the extent of the dilution being regulated to give directly upon completion of the last-mentioned causticizing step liquor of a concentration suitable for use in the treatment of cellulosic fiber bearing material, and treating such material with cooking liquor including such resulting liquor without an intervening evaporation treatment.

25. The method of causticizing sodium carbonate, which comprises subjecting a relatively concentrated solution containing sodium carbonate and suspended carbon to a partial causticizing with lime, separating resulting partially causticized solution from resulting lime mud including carbon, washing the separated lime mud to remove adhering sodium compounds, diluting the partially causticized solution with a relatively weak solution resulting from washing of the lime mud, the weak solution being added in amount regulated to give after a subsequent causticizing step a solution of the desired strength without subsequent evaporation, and completing the causticizing treatment after adding a further amount of lime to the diluted solution.

26. The process which comprises the following steps: a digesting treatment of cellulosic-fiber-bearing material by means of matter including a reactive inorganic compound, treating resulting products so as to obtain inorganic matter including sodium carbonate and carbon, forming a liquor including such sodium carbonate together with suspended carbon, treating such liquor to obtain a cooking liquor that is substantially free from suspended carbon and utilizing such cooking liquor in a digesting treatment of cellulosic-fiber-bearing material, the treatment of the sodium carbonate-containing liquor together with suspended carbon including an initial treatment with calcium hydroxide in an amount which is less than 74 pounds for each 106 pounds of sodium carbonate therein so as to obtain undissolved matter that includes calcium carbonate and carbon, and after the calcium hydroxide used in such treatment is substantially all converted to calcium carbonate washing the said undissolved matter with water and using the washings in preparing the said cooking liquor.

27. The process as defined in claim 26 in which calcium hydroxide and calcium carbonate from a previous causticizing treatment are used, without previously removing all water-soluble matter, in treating a sodium carbonate-containing liquor.

28. The process as defined in claim 26 in which less than one-half of the sodium carbonate content of the liquor is converted into sodium hydroxide in the said initial treatment with calcium hydroxide.

29. The process as defined in claim 26 in which less than one-half of the sodium carbonate content of the liquor is converted into sodium hydroxide by the said initial treatment with calcium hydroxide and the greater portion of the remaining sodium carbonate is thereafter converted into sodium hydoxide by a treatment with calcium hydroxide subsequent to separation of lime mud including carbon from partially causticized liquor formed by the initial treatment with calcium hydroxide.

30. The method of causticizing sodium carbonate in solution, which comprises subjecting a solution containing sodium carbonate and suspended carbon to a causticizing treatment with an amount of calcium hydroxide which is less than 74 pounds for each 106 pounds of sodium carbonate in the solution, separating at least a considerable portion of resulting liquor from resulting lime mud including carbon, later treating the separated portion of the liquor with calcium hydroxide in amount sufficient and under conditions adapted to convert some of its contained sodium carbonate into sodium hydroxide and to yield a liquor comprising sodium hydroxide and a substantial but lesser amount of sodium carbonate, and removing such liquor from a lime mud which contains both calcium hydroxide and calcium carbonate.

31. The method of causticizing sodium carbonate in solution, which comprises subjecting a solution containing sodium carbonate and suspended carbon to a causticizing treatment with calcium hydroxide, separating at least a considerable portion of resulting liquor from resulting lime mud including carbon, later treating the separated portion of the liquor with an amount of calcium hydroxide which is at least 74 pounds for each 106 pounds of sodium carbonate in the separated portion of the liquor and under conditions adapted to convert some of its contained sodium carbonate into sodium hydroxide and to yield a liquor comprising sodium hydroxide and a substantial but lesser amount of sodium carbonate, and removing such liquor from a lime mud which contains both calcium hydroxide and calcium carbonate.

32. The method of causticizing sodium carbonate in solution, which comprises subjecting a solution containing sodium carbonate and suspended carbon to a causticizing treatment with calcium hydroxide, separating at least a considerable portion of resulting liquor from resulting lime mud including carbon, later treating the separated portion of the liquor with calcium hydroxide in amount sufficient and under conditions regulated to convert some of its contained sodium carbonate into sodium hydroxide and to yield a liquor comprising sodium hydroxide and a substantial but lesser amount of sodium carbonate and removing such liquor from a lime mud which contains both calcium hydroxide and calcium carbonate, the calcium hydroxide used in the first-mentioned causticizing treatment being substantially all converted into calcium carbonate before it is subjected to its final washing treatment.

33. The process of causticizing a solution including sodium carbonate together with carbon derived from residual liquor of a pulp-making operation, which comprises treating the solution and carbon with lime mud resulting from a previous causticizing treatment, the lime mud containing calcium hydroxide in amount less than 74 pounds for each 106 pounds of sodium carbonate in the solution, and thereafter treating the liquor with calcium hydroxide in amount at least about equal to 74 pounds for each 106 pounds of sodium carbonate contained in the first-mentioned solution.

34. The process of causticizing a solution including sodium carbonate together with carbon derived from residual liquor of a pulp-making operation, which comprises treating the solution and carbon with lime mud from a previous causticizing treatment, such lime mud containing such an amount of calcium hydroxide and the temperature and concentration of the solution being such that the sodium carbonate content of the solution will convert substantially all of the calcium hydroxide into calcium carbonate and thereafter treating the liquor with calcium hydroxide in amount larger than 74 pounds for each 106 pounds of sodium carbonate contained in the partially causticized liquor.

35. The process which comprises the following steps; digesting wood by means of liquor which includes sodium hydroxide, removing water from resulting liquor, furnacing the residue so as to obtain inorganic matter including sodium carbonate and carbon, forming a liquor which includes such sodium carbonate and carbon, treating a portion of such liquor with less than 74 pounds of calcium hydroxide for each 106 pounds of sodium carbonate in such portion, mixing the resulting liquor with another portion of sodium carbonate, treating the mixed liquor with calcium hydroxide in amount at least about equal to 74 pounds for each 106 pounds of the original sodium carbonate content of the said two portions used in producing the said mixed liquors, and using residual calcium hydroxide from the latter causticizing treatment for a preliminary causticizing treatment of another sodium carbonate-containing liquor that contains carbon.

36. The process which comprises the following steps: preparing a liquor which includes sodium carbonate and carbon, treating at least a portion of such liquor by means of material including calcium hydroxide so as to obtain liquor which contains sodium hydroxide and sodium carbonate, separating at least a portion of resulting liquor from at least a portion of undissolved matter including calcium carbonate and carbon, treating such separated liquor by means of material including calcium hydroxide so as to convert a portion only of its contained sodium carbonate into sodium hydroxide and so as to form a lime mud which includes both calcium hydroxide and calcium carbonate, separating at least a portion of resulting liquor from at least a portion of such resulting lime mud, and utilizing at least a portion of such sodium hydroxide in a liquor for a solubilizing treatment of cellulosic fiber bearing material, at least one of the said carbonate containing liquors also including sodium sulfide.

37. The method of causticizing sodium carbonate in solution, which comprises subjecting a solution containing sodium carbonate together with carbon to a causticizing treatment with calcium hydroxide, separating at least a considerable portion of resulting liquor from resulting lime mud including carbon, later treating the separated portion of the liquor with calcium hydroxide in amount sufficient and under conditions adapted to convert some of its contained sodium carbonate into sodium hydroxide and to yield a liquor comprising sodium hydroxide and a substantial but lesser amount of sodium carbonate, removing such liquor from a lime mud which contains both calcium hydroxide and calcium carbonate, and utilizing the last mentioned lime mud at least in part in the first mentioned causticizing treatment without an intervening washing treatment adapted to remove all water soluble sodium compounds from the calcium compounds.

38. The process of treating a solution comprising sodium carbonate together with carbon derived from residual liquor resulting from a solubilizing treatment of cellulosic-fibre-bearing material, which comprises the following steps: subjecting such solution and suspended carbon to a treatment with an undissolved calcium-bearing compound adapted to effect at least partial clarification of the solution, separating resulting liquor from at least a considerable portion of undissolved matter including carbon, treating such liquor by means of an undissolved calcium-bearing compound, separating resulting liquor from an undissolved calcium-bearing compound, using such separated undissolved calcium-bearing compound to treat a solution comprising sodium carbonate without an intervening washing treatment to remove substantially all sodium compounds from such undissolved calcium-bearing material.

39. Process of treating a solution including sodium carbonate together with carbon, which comprises treating such solution by means of an undissolved calcium-bearing compound which does not include calcium hydroxide in amount as great as the chemical equivalent of the sodium carbonate, separating resulting liquor from undissolved matter including carbon which is substantially free from calcium hydroxide, washing such undissolved matter with water and using the washings in the process, forming a cooking liquor including sodium derived from the first-mentioned solution, and treating cellulosic-fibre-bearing material therewith.

40. The process which comprises the following steps: (a) treating a solution comprising sodium carbonate with material including calcium hydroxide so as to produce a liquor which contains sodium hydroxide and a small amount of sodium carbonate and a lime mud which contains calcium hydroxide and calcium carbonate, (b) introducing the resulting mixture into a settler under conditions adapted to separate as a clarified liquor most but not all of the resulting liquor from the lime mud, (c) removing the settled lime mud and a small portion of the liquor from the settler and admixing such removed lime mud together with some dissolved sodium compounds with a sodium carbonate-containing liquor that contains suspended carbon and treating the mixture so as to convert some of the calcium hydroxide of the lime mud into calcium carbonate, (d) separating most of the resulting lime mud including calcium carbonate and carbon from the resulting partially causticized liquor, (e) washing the last-mentioned lime mud on a continuous type of filter so as to substantially free it from sodium compounds, thereby obtaining washings which include sodium carbonate and sodium hydroxide, and (f) using at least a considerable portion of such washings in preparing another liquor of the process.

41. The process as per claim 40, in which the first-mentioned solution contains suspended carbon, the washed lime mud mentioned in step "e" contains carbon in admixture with other solids including calcium carbonate, and at least a portion of the washed lime mud is furnaced so as to obtain calcium oxide therefrom, and such calcium oxide is used to supply calcium hydroxide for use in a causticizing step of the process.

In testimony whereof we affix our signatures.

LINN BRADLEY.
EDWARD P. McKEEFE.